United States Patent Office 3,639,537
Patented Feb. 1, 1972

3,639,537
ORGANO GLYOXYLONITRILE OXIMINO
PHOSPHATES
Harold A. Kaufman, Piscataway, N.J., assignor to
Mobil Oil Corporation
No Drawing. Filed Oct. 11, 1966, Ser. No. 585,742
Int. Cl. C07f 9/02; A01n 9/36
U.S. Cl. 260—940          5 Claims

ABSTRACT OF THE DISCLOSURE

Pesticidal compounds classed as phenyl- and substituted-phenylglyoxylonitrile oximino phosphates and phosphonates. Typical of the compounds provided are the O,O-dialkyl O-(4 - halophenylglyoxylonitrile oximino) phosphates and the S-alkyl O-(4 - halophenylglyoxylonitrile) alkylphosphonates. The invention further provides methods using said compounds as pesticides, as well as pesticidal compositions containing the new compounds and pesticidal carriers therefor.

This invention relates to new and novel organophosphorus compositions. More particularly, this invention relates to organo- and substituted organoglyoxylonitrile oximino phosphates and phosphonates, as hereinafter defined, having utility as broad spectrum pesticides.

One object of the invention is to provide new and useful compounds within the named class. It is another object to provide a method for destroying pests which comprises applying thereto a pesticidal amount of the inventive compounds per se, or pesticidally effective amounts of combinations of them with appropriate carrier adjuvants. Other objects will appear hereinafter.

In accordance with the above objects, new compounds are provided within the class described, said compounds being represented by the formula

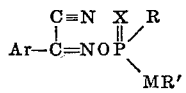

wherein Ar is an organic radical selected from the group consisting of aromatic, heterocyclic, and combinations of these as parts of the same radical, which radical may have substituted thereon a member of the group consisting of halogen, thiocyanato, $NO_2$, $C_1$–$C_4$ alkoxy, $C_1$–$C_4$ haloalkyl, aryl, aroyl, nitrilo, $C_1$–$C_4$ alkylmercapto, alkyl sulfonyl, aryl sulfonyl, $C_2$–$C_5$ carbalkoxy, amide, $C_1$–$C_4$ dialkylamino, and $C_1$–$C_6$ alkyl, R is a member of the group consisting of $C_1$–$C_4$ alkyl and $C_1$–$C_4$ alkoxy, R' is $C_1$–$C_4$ alkyl, X is a member of the group consisting of oxygen and sulfur, and M is a member of the group consisting of oxygen and sulfur, M being oxygen when R is alkoxy.

It will be understood from the above definition of the elements of the generic formula (and the appended claims are to be so construed) that the organic radical may be unsubstituted, or it may have one, two, or more of the listed substituents as portions of its nucleus.

Included among the aromatic radicals which form a part of the oximino nucleus are phenyl, naphthyl, and other multiple ring radicals containing up to about three rings. The heterocyclic systems contemplated contain a single ring having therein oxygen, sulfur, nitrogen, or a combination thereof. Examples are radicals derived from furan, pyridine, thiazole, and the like. Included among the systems which contain a combination of aromatic and heterocyclic portions as part of the same radical are benzothienyl, and the like.

In general aspect, the inventive compounds may be prepared from the appropriate chloridate or chloridothioate of the formula

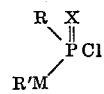

wherein R, R', M and X are as above defined, with an organoglyoxylonitrile oximino sodium salt of the formula

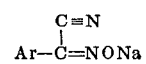

wherein Ar has the same definition as above. Specifically, they are prepared in accordance with the examples set forth hereinafter.

The organoglyoxylonitrile oximino salts (e.g., the sodium salt) can be prepared by the method described by J. T. Thurston and R. L. Shriner in J. Org. Chem. 2, 192–193 (1937), in which a cyanide (e.g., benzyl cyanide) is reacted with an appropriate base (e.g., sodium ethoxide) in an alcoholic solvent, followed by addition of butyl nitrite with preparation of the desired oximino salts.

The organophosphorus compounds of the present invention are stable and well-defined, and are particularly suited for pesticidal use when employed alone or in combination with carriers generally utilized in the pesticide art. The carrier adjuvants may be liquid or solid, depending upon the area to be treated, the type of pest to be controlled, and the kind of equipment available for application. When employing liquid formulations, they may be in the form of true solutions, dispersions, or emulsions.

"Solutions," as used herein, means that the compounds of the invention are of molecular size held in true solution by any suitable solvent therefor. It is noted that the inventive compounds are generally water insoluble, thus requiring an organic solvent having no phytotoxic effects when true solutions are desirable or necessary. Acetone, for example, although it will cause plant injury if kept in contact therewith, can be used as the solvent since it will dissipate rapidly when sprayed in the open, thus leaving the plant free from injury.

The term "dispersion" covers those liquid phases in which the active ingredient is colloidal in size and which is distributed throughout as particles held in suspension by wetting agents or by soaps. The dispersive medium is usually totally aqueous, but it may contain small quantities of organic solvent, i.e., amounts not sufficient to cause solution of the active member.

The wetting agents referred to, in addition to aiding in suspending the toxic particles, are useful as aids in uniformly distributing the active material over the area to be treated, particularly over plant areas. In other words, the wetting agent helps to prevent build-up of droplets on certain portions of the area, whereupon other portions are left untouched or insufficiently treated by the toxicant. These wetting agents are so well known to the art that it would serve no useful purpose to enumerate them here. Tween–20 (a polyethylene sorbitan monolaurate) is an example of a useful agent which can be used.

Solid formulations contemplated may be bodies of dusts or granules containing pesticidal amounts of the organophosphorus compounds of the invention. Many solids are known by the art to be useful as pesticide carriers. Examples of these are kaolin, talc, kieselguhr, diatomaceous earth, pyrophyllite, bentonite, calcium carbonate, powdered cork, wood, walnut shells and peanut shells, fuller's earth, tricalcium phosphate, and the like.

Dust or granular formulations may be prepared by grinding carrier and chemical together, followed by tumbling for a sufficient time to obtain adequate distribution of chemical. However, a more uniform product can be made if the active ingredient is dissolved in a volatile solvent, such as acetone, prior to admixing with the carrier, added to a tumbling mass of carrier, tumbled until well-mixed, and then dried in any convenient manner. The mass may be dried by applying heat thereto while tumbling or by spreading it into a thin layer and allowing it to dry in the open.

Additionally, the inventive organophosphorus compounds may be applied as aerosols, in which case it is convenient to dissolve them in any suitable solvent and to disperse this solution in dichlorofluoromethane or other chlorofluoroalkane having a boiling point below room temperature at ambient pressures. It is contemplated that other suitable materials boiling below room temperature will also be useful for this purpose.

The concentration of the chemicals disclosed herein may vary over a wide range provided a lethal or toxic dosage thereof is placed upon the insect or in its immediate surroundings. Practically, the formulations will contain from about 0.0001 to about 1% of active ingredient by weight. Somewhat more than 1% may at times be necessary because of weather conditions, pest resistance, and the like. Usually, however, there will be no advantage in using more than 1%.

In controlling soil-borne pests, the toxicant or compositions containing it may be sprayed (if a liquid) or spread (if a solid) over the ground. Thereafter, the material may be left to the natural action of rainfall, or it may be drenched or plowed and disked into the soil. If the host is plant life, a solid formulation may be dusted onto the plant by the same method used to apply other well known solid pesticidal compositions. When liquid sprays are employed to treat plant hosts, the liquid composition may be sprayed onto the plant just to the point of liquid run-off.

Having described the invention in general terms, the following examples of the chemicals of this invention and their use as pesticides are offered. It will be understood that the examples given merely illustrate the invention by way of specific embodiments, and thus are not to be construed as limitations upon it. The invention, with respect to the chemicals themselves and to their use against pests, is to be limited only to the extent of the broader definition set forth hereinbefore, the appended claims and reasonable equivalents flowing therefrom. In the examples, "parts" are parts by weight unless otherwise designated.

EXAMPLE 1

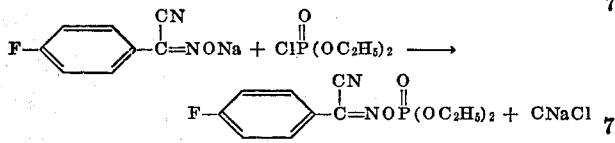

Six parts of p-fluorophenylglyoxylonitrile oximino salt [prepared by the method of Thurston and Shriner, having a melting point of 278° C., a nitrogen content of 14.49% (theory 15.05%), and having an IR spectra containing consistent strong CN peak at 2230 cm.$^{-1}$, major peaks at 3450 cm.$^{-1}$, 1504 cm.$^{-1}$, 1010 cm.$^{-1}$ and 834 cm.$^{-1}$, with a smaller peak at 1620 cm.$^{-1}$] was slurried in about 25 parts of benzene, and 5.5 parts of O,O-diethyl phosphorochloridate was added dropwise over a five hour period, with stirring, at 40° C. The reaction mixture was stirred at reflux for one hour after completing the addition, and was then cooled. The mixture was then washed with 10 parts of 5% sodium hydroxide to remove unreacted chloridate and the sodium chloride which formed during the reaction. The benzene was dried with magnesium sulfate and stripped to 60° C. at 15 mm. of Hg, giving essentially a quantitative yield of product.

The product gave the following IR and NMR analyses:

IR: C≡N at 2230 cm.$^{-1}$, C=C (aromatic) at 1595 cm.$^{-1}$, C=N at 1510 cm.$^{-1}$, P=O at 1290 cm.$^{-1}$, P—O—C at 1060 cm.$^{-1}$ consistent with desired structure.

NMR: P(OC$_2$H$_5$) group shown by CH$_3$ triplet at 8.55τ and CH$_2$ quintet at 5.65τ. Two types of aromatic protons were indicated by multiplets centered at 2.1τ and 2.68τ. The proton count was commensurate with the assigned structure.

EXAMPLE 2

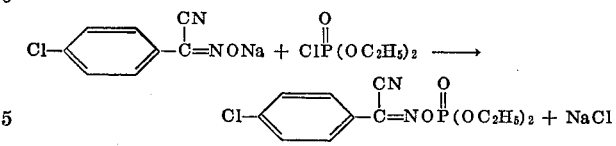

In a maner similar to Example 1, p-chlorophenylglyoxylonitrile oximino sodium salt was reacted with O,O-diethyl phosphorochloridate to give the product, having the following IR constants:

C≡N at 2225 cm.$^{-1}$, C=C (aromatic) at 1590 cm.$^{-1}$, C=N at 1495 cm.$^{-1}$, P=O at 1280 cm.$^{-1}$, and P—O—C at 1050 cm.$^{-1}$.

EXAMPLE 3

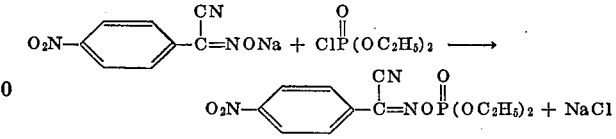

In a manner similar to Example 1, p-nitrophenylglyoxylonitrile oximino sodium salt was reacted with O,O-diethyl phosphorochloridate to give the product having IR constants consistent with the assigned structure.

EXAMPLE 4

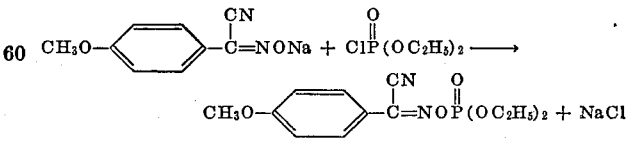

In a manner similar to Example 1, p-methoxyphenylglyoxylonitrile oximino sodium salt was reacted with O,O-diethyl phosphorochloridate to give the product having IR constants consistent with the asigned structure.

EXAMPLE 5

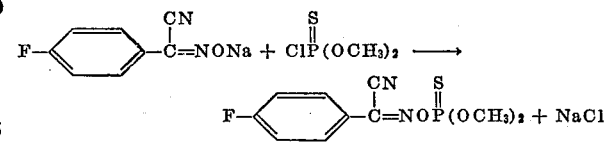

Eleven parts of p-fluorophenylglyoxylonitrile sodium salt was slurried in about 40 parts of benzene, and 8.3 parts of O,O-dimethylphosphorochloridothioate was added thereto with stirring. No exotherm was encountered. After completion of the addition, the reaction mixture was stirred for 16 hours at reflux and then cooled. The cooled mixture was washed with 15 parts of water to remove the sodium salt which formed during the reaction. The benzene was dried over magnesium sulfate, and the solvent and unreacted chloridate were removed by distillation at 60° C. at 15 mm. of Hg. Nine parts of product were thus obtained, the said product having the following IR and NMR constants:

IR: C≡N at 2240 cm.$^{-1}$, C=C (aromatic) at 1590 cm.$^{-1}$, C=N at 1510 cm.$^{-1}$, and P—O—C at 1040 cm.$^{-1}$.

NMR: P(OCH$_3$) CH$_3$ doublet at 5.97$\tau$ and 6.15$\tau$ two types of aromatic protons shown by multiplets centered at 2.1$\tau$ and 2.8$\tau$. Proton count was commensurate with assigned structure.

EXAMPLE 6

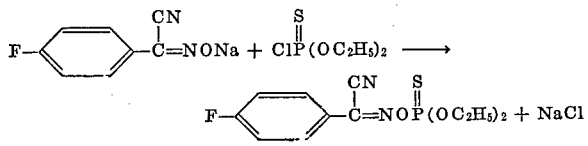

In a manner similar to Example 5, p-fluorophenylglyoxylonitrile oximino sodium salt was reacted with O,O-diethyl phosphorochloridothioate to give a 60% yield of product.

EXAMPLE 7

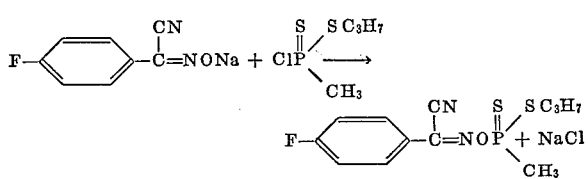

Six parts of p-fluorophenylglyoxylonitrile oximino sodium salt was slurried in about 125 parts of benzene, and six parts of S-propyl methylphosphonochloridothioate was added dropwise at room temperature, with stirring. The reaction mixture was stirred at reflux for 12 hours, and was then cooled. The mixture was thereupon washed with 125 parts of water, was dried over magnesium sulfate, was stripped to 60° C. at 15 mm. of Hg to remove solvent, and then was distilled to remove excess chloridate. 10.2 parts of the product remained after the solvent and chloridate were distilled. It had the following IR and NMR constants:

IR: C≡N at 2230 cm.$^{-1}$, C=C (aromatic) at 1595 cm.$^{-1}$, C=N at 1510 cm.$^{-1}$.

NMR: Commensurate with the assigned structure in both type and count. The spectrum showed aromatic multiplets centered at 2.2$\tau$, a methylene S—CH$_2$CH$_3$ triplet at 6.8$\tau$, a S—CH$_2$CH$_2$CH$_3$ sextet at 8.2$\tau$, and a

S—CH$_2$CH$_2$CH$_3$ triplet at 8.97$\tau$.

EXAMPLE 8

This example will illustrate the utility of the compounds of the invention against a wide variety of common household and agricultural pests.

PEST CONTROLLED, AND METHOD THEREFOR

Pea aphid—Spray test

A formulation containing 500 p.p.m. of the compound of Example 1 was prepared by dissolving 50 mg. thereof in 5 ml. of acetone, adding 0.4 ml. of Tween-20 and diluting with 95 ml. of water. Other concentrations were prepared by diluting this with the appropriate amount of water.

Ten or more aphids were placed in a petri dish screened cage, and were sprayed with 5 ml. of test solution while rotating on a turntable in a wind tunnel. The turntable was rotating at 30 r.p.m., and spraying was accomplished with a De Vilbiss micro-sprayer utilizing 15 pounds of pressure. Tests at each concentration were run in duplicate, and the results were taken after 24 hours.

Spider mite—Contact dip test

A 500 p.p.m. formulation of the compound of Example 1 was prepared as above, and diluted with water for other concentrations.

Mite infested leaves were momentarily dipped into the test solution and were then placed (stem only) into a one-ounce bottle of water. Tests were run in duplicate, and results were recorded after 72 hours.

Southern armyworm—Stomach poison test

A 500 p.p.m. solution of the Example 1 compound was prepared as above.

Bean leaves were momentarily dipped into the solution, and were allowed to dry. Immediately upon drying, a leaf was placed in a petri dish and 10 Armyworm larvae were introduced. The petri dish was screened, and results, in duplicate, were taken after 24 hours.

Mexican bean beetle—Stomach poison test

The test solution of the Example 1 compound was prepared as above, and diluted with water to give other concentrations.

This test is run exactly as directed for the Southern Armyworm.

Yellow fever mosquito larvae—In solution test

A 0.2 ml. portion of the above 500 p.p.m. solution of the compound of Example 1 was diluted to 100 ml. with water to give a 1 p.p.m. solution. This was diluted with water to give other, smaller, concentrations.

In duplicate tests, ten mosquito larvae were introduced directly into the desired solution, and results were recorded after 24 hours.

Housefly—Contact spray

A 500 p.p.m. formulation of the Example 1 compound was prepared as above and diluted with water to give other concentrations.

Ten houseflies were placed in screened petri dishes lined with filter paper, and the dishes were placed on a turntable. 10 ml. of test solution was sprayed onto the dishes from a distance of one foot, using a De Vilbiss micro-sprayed set at 10 pounds of pressure. Tests were in duplicate, with results being taken after 24 hours.

German cockroach—Contact spray

This test was run exactly as directed for the housefly, except that the cockroach was substituted therefor.

RESULTS
[Example 1]

| Pest | Percent control | | | | | |
|---|---|---|---|---|---|---|
| | 500 p.p.m. | 100 p.p.m. | 10 p.p.m. | 1 p.p.m. | 0.1 p.p.m. | 0.01 p.p.m. |
| Aphid | 100 | 95 | 90 | | | |
| Mite | 100 | 100 | | | | |
| Armyworm | 100 | | | | | |
| Bean beetle | 100 | 80 | | | | |
| Mosquito larvae | | | | 100 | 100 | 80 |
| Housefly | 100 | 100 | | | | |
| Cockroach | 100 | 40 | | | | |

In a similar manner, the following additional compounds, prepared as above, were tested against the same pests at 500 p.p.m., except in the mosquito larvae test, which was run in every case at 1 p.p.m.

| Compound | Bean beetle | Army-worm | Spider mite | House-fly | Mosquito larvae | German roach | Pea aphid | Boll weevil |
|---|---|---|---|---|---|---|---|---|
| F-C₆H₄-C(CN)=NOP(S)(OCH₃)₂ | 80 | 100 | 100 | 100 | 100 | 100 | 100 | |
| F-C₆H₄-C(CN)=NOP(S)(SC₃H₇)(CH₃) | | 60 | 80 | 50 | | | 80 | |
| (2-F)C₆H₄-C(CN)=NOP(O)(OCH₃)₂ | | 60 | 40 | 30 | 100 | | | |
| (2-F)C₆H₄-C(CN)=NOP(O)(OCH₃)₂ | 70 | 60 | 80 | 30 | 100 | | | |
| Br-C₆H₄-C(CN)=NOP(O)(OCH₃)₂ | 90 | 30 | 100 | 100 | 100 | 30 | | 100 |
| Cl-C₆H₄-C(CN)=NOP(O)(OC₂H₅)₂ | 100 | 100 | 100 | 100 | 100 | 100 | 100 | |
| Cl-C₆H₄-C(CN)=NOP(S)(OCH₃)₂ | 100 | | 90 | 100 | 100 | 70 | | 100 |
| (3-Cl)C₆H₄-C(CN)=NOP(O)(OCH₃)₂ | 50 | | 100 | | 100 | | | |
| (3,4-Cl₂)C₆H₃-C(CN)=NOP(O)(OCH₃)₂ | | | 80 | | 100 | | | |
| (2-Cl)C₆H₄-C(CN)=NOP(O)(OCH₃)₂ | 60 | | 90 | 40 | 100 | | 90 | |
| CH₃O-C₆H₄-C(CN)=NOP(O)(OC₂H₅)₂ | | | 50 | | | | | |
| (3,4-(OCH₃)₂)C₆H₃-C(CN)=NOP(O)(OCH₃)₂ | | | 80 | | 100 | | | 50 |
| C₆H₅-C(CN)=NOP(O)(OCH₃)₂ | 100 | | 100 | | 100 | | | |
| CH₃-C₆H₄-C(CN)=NOP(O)(OCH₃)₂ | | | 90 | | 100 | | | |
| (2-CF₃)C₆H₄-C(CN)=NOP(O)(OCH₃)₂ | | | 90 | 50 | 100 | | | |
| (2-CH₃)C₆H₄-C(CN)=NOP(O)(OCH₃)₂ | 80 | | 100 | | 100 | | | |
| (3-CH₃)C₆H₄-C(CN)=NOP(O)(OCH₃)₂ | 30 | 30 | 90 | | 100 | | | |
| (2,4-(CH₃)₂)C₆H₃-C(CN)=NOP(O)(OCH₃)₂ | 30 | | 70 | | 100 | | | |

| Compound | Bean beetle | Army-worm | Spider mite | House-fly | Mosquito larvae | German roach | Pea aphid | Boll weevil |
|---|---|---|---|---|---|---|---|---|
| 2,6-dimethylphenyl-C(CN)=NOP(O)(OCH$_3$)$_2$ | | | 80 | | 100 | | | |
| biphenyl-C(CN)=NOP(O)(OCH$_3$)$_2$ | 100 | | 80 | 40 | 100 | | | |
| $O_2N$-phenyl-C(CN)=NOP(O)(OC$_2$H$_5$)$_2$ | | | 100 | 100 | 30 | | | |
| 3-NO$_2$,4-OCH$_3$-phenyl-C(CN)=NOP(O)(OCH$_3$)$_2$ (with OCH$_3$) | | | 50 | | 100 | | | 30 |
| o-CN-phenyl-C(CN)=NOP(O)(OCH$_3$)$_2$ | | 30 | 90 | | 100 | | 40 | |
| benzothiophene-C(CN)=NOP(O)(OC$_2$H$_5$)$_2$ | 60 | 70 | 90 | | | | | |
| $C_2H_5OOC$-phenyl-C(CN)=NOP(O)(OCH$_3$)$_2$ | 40 | 30 | 100 | 60 | 100 | | | 40 |
| pyridyl-C(CN)=NOP(O)(OCH$_3$)$_2$ | 40 | 60 | 90 | | | | | |
| C$_6$H$_5$-CO-phenyl-C(CN)=NOP(O)(OCH$_3$)$_2$ | 50 | | 70 | | 100 | | | |

Following are additional examples of compounds which fall within the scope of the invention, and which are prepared substantially in accordance with the method set forth hereinabove.

Phenylglyoxylonitrile oximino dibutyl phosphate, p-chlorophenylglyoxylonitrile oximino methyl methylphosphonothioate, m-nitrophenylglyoxylonitrile oximino dimethyl phosphate, p-nitro-m-methylphenylglyoxylonitrile oximino dimethyl phosphorothioate, p-cyanophenylglyoxylonitrile oximino dipropyl phosphorothioate, and o-cyanophenylglyoxylonitrile oximino dimethyl phosphate.

o-Propoxyphenylglyoxylonitrile oximino diethyl phosphate, p-butoxyphenylglyoxylonitrile oximino diethyl phosphate, m-methyl- and p-methylthiophenylglyoxylonitrile oximino dimethyl phosphorothioate, p-propylthiophenylglyoxylonitrile oximino diethyl phosphate, p-butylthiophenylglyoxylonitrile oximino dibutyl phosphorothioate, p-methylphenylglyoxylonitrile oximino diethyl phosphorothioate, p-propylphenylphenylglyoxylonitrile oximino dibutyl phosphate, and p-hexylphenylglyoxylonitrile oximino diethyl phosphate.

p-Carbomethoxyphenylglyoxylonitrile oximino diethyl phosphorothioate, m-carbethoxyphenylglyoxylonitrile oximino dimethyl phosphate, p-carbopropoxyphenylglyoxylonitrile oximino dimethyl phosphate, p-carbobutoxyphenylglyoxylonitrile oximino dipropyl phosphorothioate, p-carbamylphenylglyoxylonitrile oximino dimethyl phosphate, p-(N,N - dimethylcarbamyl)phenylglyoxylonitrile oximino dimethyl phosphorothioate, 4-(dimethylamino) 3,5 - dimethyl phenylglyoxylonitrile oximino dimethyl phosphate, 3-furylglyoxylonitrile oximino dimethyl phosphate, and 4-tolylsulfurylphenylglyoxylonitrile oximino dimethyl phosphate.

I claim:
1. An organophosphorus compound of the formula

$$\text{Ar}-\underset{\underset{\text{CN}}{|}}{\text{C}}=\text{NOP}\overset{\overset{\text{X}}{\|}}{\underset{\text{MR}'}{}}\text{R}$$

wherein Ar is an organic radical selected from the group consisting of phenyl having substituted therein a member of the group consisting of C$_1$–C$_4$ haloalkyl, phenyl, benzoyl fluorine and C$_2$–C$_5$ carbalkoxy; R is a member from the group consisting of C$_1$–C$_4$ alkyl and C$_1$–C$_4$ alkoxy; R' is C$_1$–C$_4$ alkyl; X is a member of the group consisting of oxygen and sulfur, and M is a member from the group consisting of oxygen and sulfur with M being oxygen when R is alkoxy.

2. A compound, as defined in claim 1, wherein Ar is phenyl substituted with a C$_2$–C$_5$ carbalkoxy group.

3. A compound, as defined in claim 2, wherein the C$_2$–C$_5$ carbalkoxy group is —COOCH$_3$.

4. A compound, as defined in claim 3 wherein X is oxygen, R is C$_1$–C$_4$ alkoxy, M is oxygen, and Ar is phenyl having a C$_2$–C$_5$ carbalkoxy substituent.

5. The compound as defined in claim 1 having the formula

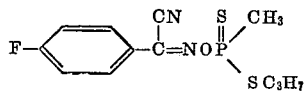

No references cited.

CHARLES B. PARKER, Primary Examiner
A. H. SUTTO, Assistant Examiner

U.S. Cl. X.R.
260—294.9, 330.5, 347.7, 972; 424—200, 202, 203, 210

UNITED STATES PATENT OFFICE
CERTIFICATE OF CORRECTION

Patent No. 3,639,537   Dated February 1, 1972

Inventor(s) Harold A. Kaufman

It is certified that error appears in the above-identified patent and that said Letters Patent are hereby corrected as shown below:

Column 6, line 52, "microsprayed" should read -- microsprayer --. Column 9, line 60, "p-propylphenylphenylglyoxylonitrile" should read -- p-propylphenylglyoxylonitrile --.

Signed and sealed this 10th day of October 1972.

(SEAL)
Attest:

EDWARD M. FLETCHER, JR.
Attesting Officer

ROBERT GOTTSCHALK
Commissioner of Patents